(12) United States Patent
Saxe et al.

(10) Patent No.: US 9,589,737 B2
(45) Date of Patent: Mar. 7, 2017

(54) APPARATUS FOR STORING ELECTRICAL ENERGY AND PORTABLE ELECTRONIC DEVICE

(75) Inventors: Christian Saxe, Copenhagen East (DK); Martin Feilberg Hansen, Frederiksberg C (DK); Olle Henrik Linden, Hollviken (SE); Rasmus Vistisen, Copenhagen K (DK); Markku Juhani Rajamaki, Littoinen (FI)

(73) Assignee: Nokia Technologies Oy, Espoo (FI)

( * ) Notice: Subject to any disclaimer, the term of this patent is extended or adjusted under 35 U.S.C. 154(b) by 62 days.

(21) Appl. No.: 14/366,706

(22) PCT Filed: Dec. 20, 2011

(86) PCT No.: PCT/IB2011/055825
§ 371 (c)(1),
(2), (4) Date: Jun. 19, 2014

(87) PCT Pub. No.: WO2013/093553
PCT Pub. Date: Jun. 27, 2013

(65) Prior Publication Data
US 2015/0004442 A1  Jan. 1, 2015

(51) Int. Cl.
| | |
|---|---|
| H04M 1/02 | (2006.01) |
| H01M 2/10 | (2006.01) |
| H01G 9/28 | (2006.01) |
| H01M 10/04 | (2006.01) |
| H01M 10/42 | (2006.01) |
| H01G 9/04 | (2006.01) |
| H01M 2/02 | (2006.01) |

(52) U.S. Cl.
CPC ............... *H01G 9/28* (2013.01); *H01G 9/04* (2013.01); *H01M 2/0207* (2013.01); *H01M 2/1066* (2013.01); *H01M 10/04* (2013.01); *H01M 10/0436* (2013.01); *H01M 10/425* (2013.01); *H01M 2002/0205* (2013.01); *H01M 2220/30* (2013.01); *H04M 1/0262* (2013.01); *H04M 2001/0204* (2013.01); *Y10T 29/49002* (2015.01)

(58) Field of Classification Search
None
See application file for complete search history.

(56) References Cited

U.S. PATENT DOCUMENTS

| | | | |
|---|---|---|---|
| 6,071,640 A | 6/2000 | Robertson, Jr. et al. | 429/100 |
| 7,088,075 B2 | 8/2006 | Baba et al. | 320/112 |
| 7,518,673 B2 | 4/2009 | Doui | 349/58 |

(Continued)

FOREIGN PATENT DOCUMENTS

| | | |
|---|---|---|
| CN | 101110849 A | 1/2008 |
| JP | 2000285881 A | 10/2000 |
| WO | WO 2011/094286 A2 | 8/2011 |

OTHER PUBLICATIONS

"Welcome to the V2 Forum", http://forum.V2cigs.com/discussion, Feb. 2011, 3 pgs.

(Continued)

*Primary Examiner* — Miriam Stagg
*Assistant Examiner* — Wojciech Haske
(74) *Attorney, Agent, or Firm* — Harrington & Smith

(57) ABSTRACT

An apparatus including an electrochemical cell defining an aperture therein, the aperture being configured to receive one or more components of an electronic device therein.

20 Claims, 14 Drawing Sheets

(56) References Cited

U.S. PATENT DOCUMENTS

| | | | |
|---|---|---|---|
| 7,532,910 B2 | 5/2009 | Chen | 455/556.1 |
| 2001/0014006 A1* | 8/2001 | Kim | G06F 1/1616 361/679.55 |
| 2002/0160728 A1 | 10/2002 | Morita | 455/90 |
| 2003/0008208 A1* | 1/2003 | Yamazaki | H01M 2/0207 429/158 |
| 2003/0044678 A1* | 3/2003 | ESq. | G06F 1/1613 429/162 |
| 2003/0091894 A1 | 5/2003 | Hsueh | 429/98 |
| 2008/0263855 A1 | 10/2008 | Li et al. | 29/623.5 |
| 2009/0095808 A1 | 4/2009 | Naccache | 235/380 |
| 2010/0033125 A1 | 2/2010 | Yamada | 320/101 |
| 2010/0056235 A1 | 3/2010 | Gouro et al. | 455/575.7 |
| 2010/0091442 A1* | 4/2010 | Theobald | G06F 1/1616 361/679.09 |
| 2010/0114679 A1 | 5/2010 | Pan | 705/14.4 |
| 2011/0070473 A1 | 3/2011 | Chen et al. | 429/100 |

OTHER PUBLICATIONS

"Cameraless Droid Pro", http://forum.xda-developers.com/showthread, Jun. 2008, 5 pgs.

* cited by examiner

APPARATUS FOR STORING ELECTRICAL ENERGY AND PORTABLE ELECTRONIC DEVICE

TECHNOLOGICAL FIELD

Embodiments of the present invention relate to apparatus for storing electrical energy. In particular, they relate to apparatus for storing electrical energy in portable electronic devices.

BACKGROUND

Apparatus, such as portable electronic devices, usually include one or more electrochemical cells and a plurality of other components such as, for example, one or more processors, one or more memories, a display, a loudspeaker, a microphone, a transceiver and one or more antennas. The one or more electrochemical cells are configured to provide electrical energy to the other components of the apparatus to enable them to function.

For various portable electronic devices (for example, mobile cellular telephones and tablet computers), consumers usually demand that the device has a relatively low depth. However, consumers usually also demand that the device is able to perform a multitude of functions (for example, internet browsing, music and video playback, camera functionality, telephone functionality) and this may increase the depth of the device due to the addition of further components.

It would therefore be desirable to provide an alternative apparatus.

BRIEF SUMMARY

According to various, but not necessarily all, embodiments of the invention there is provided an apparatus comprising: an electrochemical cell defining an aperture therein, the aperture being configured to receive one or more components of an electronic device therein.

The one or more components may include a camera.

The aperture may be a through hole. Alternatively, the aperture may be a blind hole.

The aperture may be enclosed by the electrochemical cell. Alternatively, the aperture may be open along at least one side edge of the aperture.

The electrochemical cell may include a plurality of electrodes, the aperture may extend through the plurality of electrodes.

The electrochemical cell may comprise a rolled layer, the rolled layer may include the plurality of electrodes. The plurality of electrodes may alternatively have a planar laminate structure.

The apparatus may further comprise a display and a chassis configured to receive a printed wiring board, the electrochemical cell may be positioned between the display and the chassis.

The apparatus may further comprise a cover defining an aperture for a camera, and a printed wiring board, the electrochemical cell may be positioned between the cover and the printed wiring board. The electrochemical cell may be fastened to the printed wiring board via adhesive.

The apparatus may further comprise a first chassis configured to receive a display, and a second chassis, wherein the electrochemical cell and a printed wiring board may be positioned between the first chassis and the second chassis.

The apparatus may further comprise a cover defining an aperture for a camera, a first chassis configured to receive a display, a second chassis configured to receive a printed wiring board, the electrochemical cell may be positioned between the second chassis and the cover and may be fastened to the second chassis via adhesive.

The apparatus may further comprise a first chassis configured to receive a display, a second chassis configured to receive a printed wiring board, the electrochemical cell may be positioned between the first chassis and the second chassis and fastened to the second chassis via an adhesive.

According to various, but not necessarily all, embodiments of the invention there is provided a portable electronic device comprising an apparatus as described in any of the preceding paragraphs.

According to various, but not necessarily all, embodiments of the invention there is provided a method comprising: defining an aperture in an electrochemical cell, the aperture being configured to receive one or more components of an electronic device therein.

The one or more components may include a camera.

The aperture may be a through hole. Alternatively, the aperture may be a blind hole.

The aperture may be enclosed by the electrochemical cell.

The aperture may be open along at least one side edge of the aperture.

The electrochemical cell may include a plurality of electrodes, the aperture may extend through the plurality of electrodes.

The electrochemical cell may comprise a rolled layer, the rolled layer may include the plurality of electrodes. Alternatively, the plurality of electrodes may have a planar laminate structure.

The method may further comprise providing a display and providing a chassis configured to receive a printed wiring board, and positioning the electrochemical cell between the display and the chassis.

The method may further comprise providing a cover defining an aperture for a camera, and providing a printed wiring board, and positioning the electrochemical cell between the cover and the printed wiring board. The method may further comprise fastening the electrochemical cell to the printed wiring board via adhesive.

The method may further comprise providing a first chassis configured to receive a display, providing a second chassis, and positioning the electrochemical cell and a printed wiring board between the first chassis and the second chassis.

The method may further comprise providing a cover defining an aperture for a camera, providing a first chassis configured to receive a display, providing a second chassis configured to receive a printed wiring board, and positioning the electrochemical cell between the second chassis and the cover and fastening the electrochemical cell to the second chassis via adhesive.

The method may further comprise providing a first chassis configured to receive a display, providing a second chassis configured to receive a printed wiring board, positioning the electrochemical cell between the first chassis and the second chassis and fastening the electrochemical cell to the second chassis via an adhesive.

BRIEF DESCRIPTION

For a better understanding of various examples of embodiments of the present invention reference will now be made by way of example only to the accompanying drawings in which.

DETAILED DESCRIPTION

In the following description, the wording 'connect' and 'couple' and their derivatives mean operationally connected or coupled. It should be appreciated that any number or combination of intervening components can exist (including no intervening components).

The figures illustrate an apparatus 10 comprising: an electrochemical cell 20, 24, 28 and 44 defining an aperture 22, 26 and 42 therein, the aperture 22, 26, 42 being configured to receive one or more components of an electronic device therein.

Figure 1:
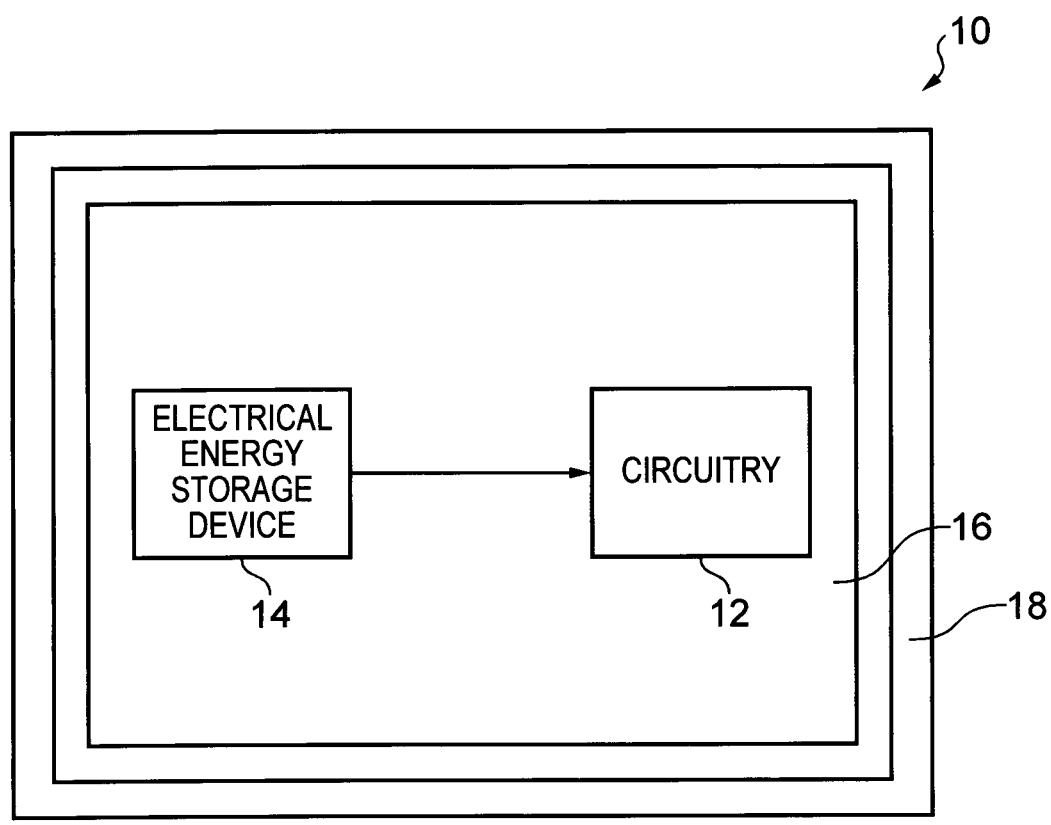
FIG. 1 illustrates a schematic diagram of an apparatus according to various embodiments of the invention.

In more detail, FIG. 1 illustrates an apparatus 10 that includes circuitry 12, an electrical energy storage device 14, a printed wiring board (PWB) 16 and a cover 18. The apparatus 10 may be any electronic device such as a hand portable electronic communication device (for example, a mobile cellular telephone, a tablet computer, a laptop computer, a personal digital assistant or a hand held computer), a non-portable electronic device (for example, a personal computer or a base station for a cellular network), a portable multimedia device (for example, a music player, a video player, a game console and so on) or a module for such devices. As used here, 'module' refers to a unit or apparatus that excludes certain parts or components that would be added by an end manufacturer or a user. For example, where the apparatus 10 is a module, the apparatus 10 may only include the electrical energy storage device 14.

The circuitry 12 may include any combination of components of the apparatus 10. For example, the circuitry 12 may include one or more processors, one or more memories, a display, an audio input device (a microphone for example), an audio output device (a loudspeaker for example), transceiver circuitry, one or more antennas and/or a user input device (a keypad or touch screen circuitry for example).

The electrical energy storage device 14 may be a single electrochemical cell or may include a plurality of electrochemical cells. The one or more electrochemical cells may include any combination of suitable cells and may include (but are not limited to) any combination of nickel cadmium cells, nickel metal hydride cells, lithium-ion cells for example. The electrical energy storage device 14 is configured to store electrical energy and to provide the stored electrical energy to at least some of the circuitry 12 of the apparatus 10.

The electrical energy storage device 14 includes any combination of one or more of the electrochemical cells illustrated in FIGS. 2A, 2B, 3 and 4. In some embodiments, the electrical energy storage device 14 may include any combination of one or more electrochemical cells as illustrated in FIGS. 2A, 2B, 3, 4 and one or more standard electrochemical cells.

The circuitry 12 and the electrical energy storage device 14 may be interconnected via the printed wiring board 16. The electrical energy storage device 14 may supply electrical energy to the circuitry 12 via conductive traces on the printed wiring board. In some embodiments, the circuitry 12 may include charging circuitry and the electrical energy storage device 14 may be configured to receive electrical energy from the charging circuitry to thereby charge.

The cover 18 defines at least part of the exterior visible surface of the apparatus 10 and is configured to at least partially house the circuitry 12, the electrical energy storage device 14 and the printed wiring board 16 therein. The cover 18 may comprise any suitable material and may comprise one or more metals and/or one or more polymers for example. The cover 18 may define one or more apertures in which circuitry (such as a display, a loudspeaker, a microphone, a user input device) may be positioned.

Figure 2A:
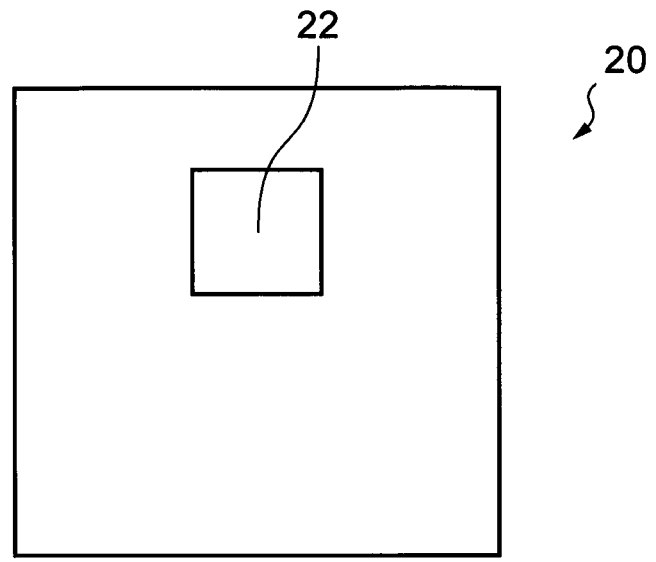
FIG. 2A illustrates a plan view of an electrochemical cell according to various embodiments of the invention.

FIG. 2A illustrates a plan view of an electrochemical cell 20 according to various embodiments of the invention. The electrochemical cell 20 defines an enclosed aperture 22 therein. The aperture 22 is enclosed in that the electrochemical cell 20 surrounds the whole perimeter of the aperture 22 when the electrochemical cell is viewed in plan. The aperture 22 may be positioned at any location in the electrochemical cell 20 and the position illustrated in FIG. 2A is exemplary.

The aperture 22 may be a blind hole (that is, the aperture 22 may not extend all the way through the electrochemical cell 20 and light cannot pass through the aperture 22) or may be a through hole (that is, the aperture 22 may extend all the way through the electrochemical cell 20 and light may pass through the aperture 22). The aperture 22 is illustrated as having a square cross sectional shape in FIG. 2A. However, in other embodiments, the aperture 22 may have any shape suitable for receiving any component of the apparatus 10 (for example, the aperture 22 may have a circular cross sectional shape).

The aperture 22 is configured to receive one or more components of an electronic device therein. For example, the aperture 22 may be shaped and dimensioned so that a camera may be snugly positioned within the aperture 22. By way of another example, the aperture 22 may be shaped and dimensioned so that an antenna and transceiver circuitry may be snugly positioned within the aperture 22.

It should be appreciated that the electrochemical cell 20 may include a plurality of apertures 22 and that each aperture 22 may be configured to receive a different component of the apparatus 10. For example, a first aperture may be configured to receive a camera, a second aperture may be configured to receive an antenna and radio frequency circuitry and a third aperture may be configured to receive a loudspeaker.

Figure 2B:
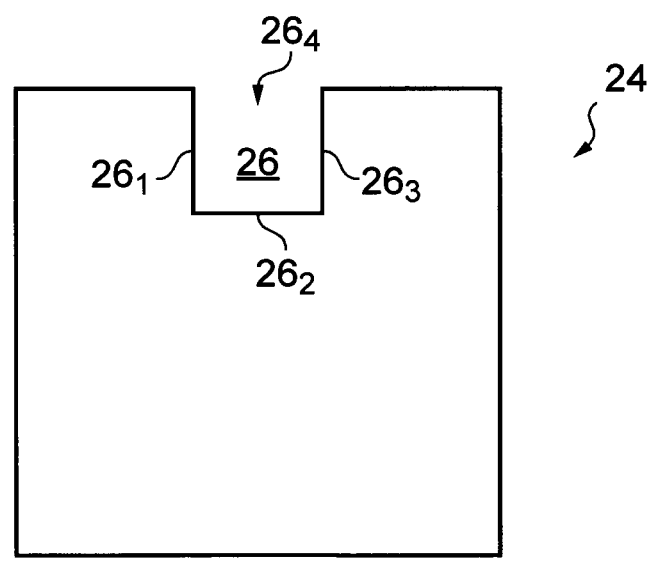
FIG. 2B illustrates a plan view of another electrochemical cell according to various embodiments of the invention.

FIG. 2B illustrates a plan view of another electrochemical cell 24 according to various embodiments of the invention. The electrochemical cell 24 is similar to the electrochemical cell 20 illustrated in FIG. 2A, but differs in that the electrochemical cell 24 defines an aperture 26 that is open along at least one side edge of the aperture 26 (that is, the aperture 26 is not fully enclosed around its perimeter by the electrochemical cell 24). The aperture 26 may be a through hole or a blind hole and is configured to receive one or more components of an electronic device therein.

In more detail, the aperture 26 has a first side edge $26_1$, a second side edge $26_2$, a third side edge $26_3$ and a fourth side edge $26_4$. The first, second and third side edges $26_1$, $26_2$, $26_3$ are enclosed by the electrochemical cell 24 and the fourth side edge $26_4$ is open and is not enclosed by the electrochemical cell 24.

It should be appreciated that the aperture 26 may be open along any portion of its perimeter. For example, in one embodiment, the third side edge $26_3$ and the fourth side edge $26_4$ may be open and not enclosed by the electrochemical cell 24.

It should be appreciated that the aperture 26 may have any suitable shape that is configured to receive a component of the apparatus 10 and that any portion or portions of that shape may be open. In one embodiment, one or more side edges could be shaped to receive a component. For example, the side edge of a circular aperture may be shaped to form a screw thread so as to accept a component which has a corresponding thread. In one embodiment, the side edge may be slanted or wavy when viewed from a plane orthogonal to the plane shown in FIGS. 2A & 2B. A slanted side edge may provide a push fit when the component is inserted into the aperture, so as to provide an interference or friction fit. The shaped side edge may only be present on an external face and the internal face of the side edge may be as shown in FIGS. 2A & 2B, this means that the internal arrangement of the electrochemical cell is easier to design.

Figure 3:
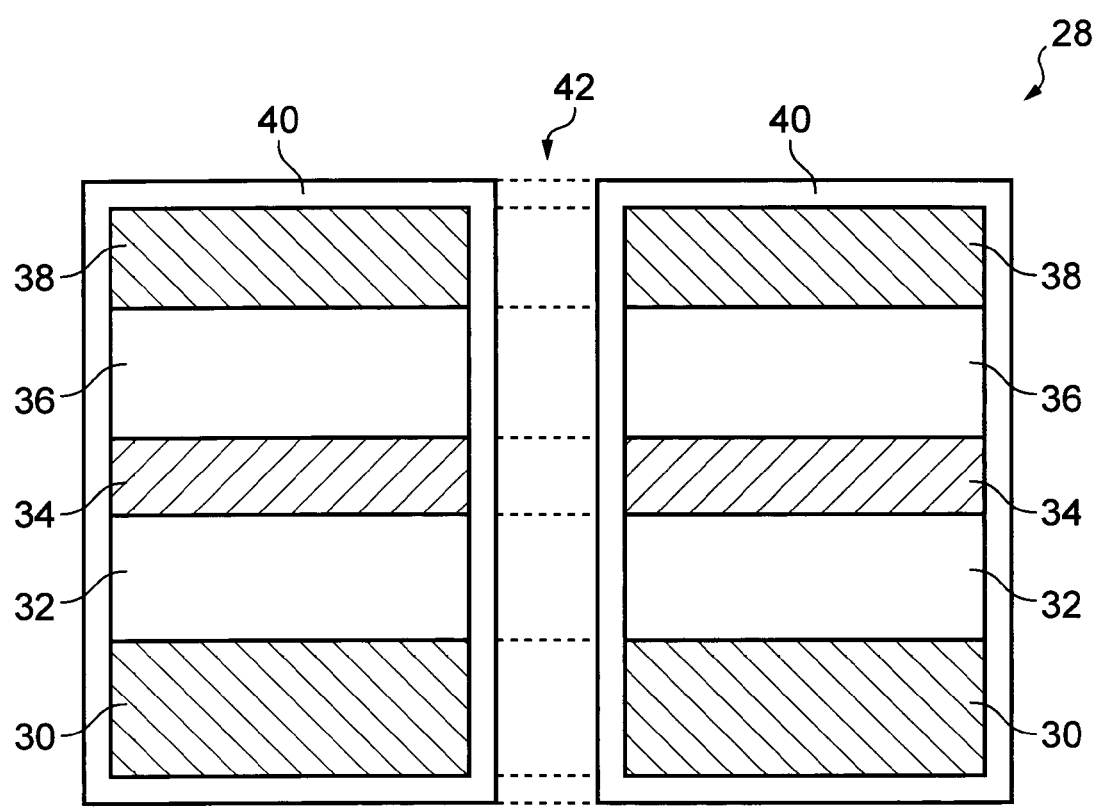
FIG. 3 illustrates a cross sectional side view of a further electrochemical cell according to various embodiments of the invention.

FIG. 3 illustrates a cross sectional side view of a further electrochemical cell 28 according to various embodiments of the invention. The electrochemical cell 28 has a laminate structure and includes the following planar layers (from the bottom of FIG. 3 to the top of FIG. 3) a first electrode 30 (for example a first anode), a first separator 32, a second electrode 34 (for example, a cathode), a second separator 36 and a third electrode 38 (for example, a second anode). The electrochemical cell 28 also includes a casing 40 that houses the first electrode 30, the first separator 32, the second electrode 34, the second separator 36 and the third electrode 38.

It should be appreciated that the electrochemical cell 28 may include any number of layers and is not limited to the number of layers mentioned in this embodiment. For example, the electrochemical cell 28 may include any number of electrode and separator layers.

The electrochemical cell 28 defines an aperture 42 that extends through the first electrode 30, the first separator 32, the second electrode 34, the second separator 36 and the third electrode 38. The casing 40 extends into the aperture 42 and seals the first electrode 30, the first separator 32, the second electrode 34, the second separator 36 and the third electrode 38 from the outside world. As described above with reference to FIGS. 2A and 2B, the aperture 42 is configured to receive one or more components (such as a camera) of the apparatus 10 therein.

The aperture 42 illustrated in FIG. 3 is a through hole since it extends through all the layers of the electrochemical cell 28 and enables light to pass there through. In other embodiments, the aperture 42 may be a blind hole and may not extend through all the layers of the electrochemical cell 28.

In order to manufacture the electrochemical cell 28, apertures are first formed in each of the first electrode 30, the first separator 32, the second electrode 34, the second separator 36 and the third electrode 38. The layers 30, 32, 34, 36, 38 are then positioned in the laminate structure illustrated in FIG. 3 so that the apertures line up to form the aperture 42. The layers 30, 32, 34, 36, 38 may then be subjected to heat treatment so that the layers 30, 32, 34, 36, 38 adhere to one another. The casing 40 is then formed around the layers 30, 32, 34, 36, 38 to seal them from the outside world.

Figure 4:
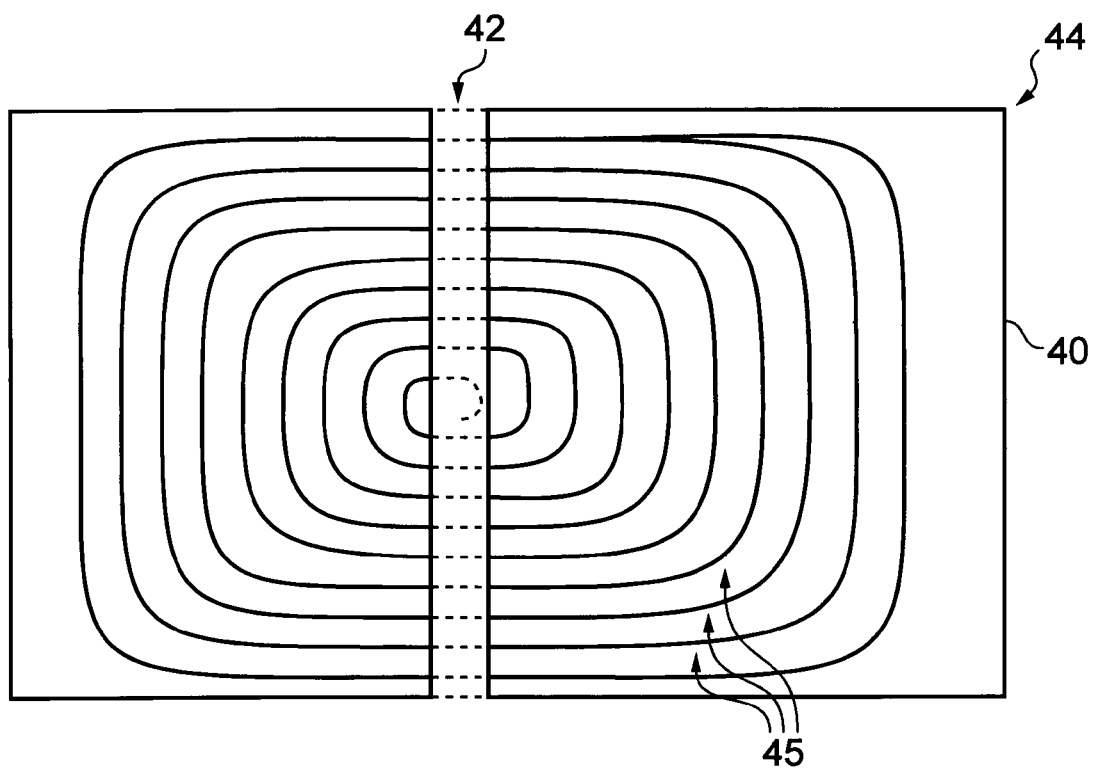
FIG. 4 illustrates a cross sectional side view of another electrochemical cell according to various embodiments of the invention.

FIG. 4 illustrates a cross sectional side view of another electrochemical cell 44 according to various embodiments of the invention. The electrochemical cell 44 is similar to the electrochemical cell 28 illustrated in FIG. 3 and where the features are similar, the same reference numerals are used.

The electrochemical cell 44 is different to the electrochemical cell 28 in that it includes a rolled layer 45 that includes (in laminate order) a first separator, an anode, a second separator and a cathode. The first separator, the anode, the second separator and the cathode are not separately illustrated in FIG. 4 in order to maintain the clarity of FIG. 4. The aperture 42 extends through the rolled layer 45 and consequently forms a through hole in the electrochemical cell 44. In other embodiments, the aperture 42 may not extends through the whole of the rolled layer 45 and may consequently form a blind hole in the electrochemical cell 44.

In order to manufacture the electrochemical cell 44, the first separator, the anode, the second separator and the cathode of the layer 45 are placed on top of one another and are then rolled together. The rolled layer 45 may then be subjected to heat treatment so that the first separator, the anode, the second separator and the cathode of the layer 45 adhere to one another. The aperture 42 may then formed by cutting through the rolled layer 45. The casing 40 is then formed around the rolled layer 45 to seal it from the outside world. In other embodiments, the aperture 42 may be pre-formed in each of the first separator, the anode, the second separator and the cathode so that as they are rolled together, the apertures in layer line up with one another to form the aperture 42.

Various embodiments of the invention provide an advantage in that the electrochemical cell may enable the size of an electronic device to be reduced. Since one or more components of the electronic device may be positioned in the aperture defined by the electrochemical cell, the size of the electronic device may be smaller than an electronic device that includes a standard electrochemical cell. Where a component has a relatively large height (such as a camera or an antenna), placing the component in the aperture defined by the electrochemical cell may advantageously reduce the depth of the electronic device. For example, where the electronic device is a mobile cellular telephone, various embodiments of the invention may result in the mobile cellular telephone having a depth of approximately eight millimeters or less. If the camera were to be placed above (or below) a standard electrochemical cell (without an aperture) then the mechanical dimensions would be much greater in height (or thickness) than for the electrochemical cells described herein. Alternatively, if the camera were to be placed at the side of a standard electrochemical cell (without an aperture) then the mechanical dimensions would be much greater in width and/or length.

Various embodiments of the invention also provide an advantage in that they may enable a component of the electronic device to be positioned at any position in the electronic device because the aperture may be defined at any position within the electrochemical cell. Where a camera is positioned within the aperture of the electrochemical cell, the aperture and hence camera may be positioned at a position in the electronic device that is optimal for photography (for example, at a position where a user is unlikely to place his or her finger over a lens or a flash of the camera). Where an antenna is positioned within the electrochemical cell, the aperture and hence antenna may be positioned at a position in the electronic device that is optimal for radio frequency performance (for example, at a position where the antenna is more isolated from other components of the electronic device). Similarly, audio components, for example speakers or microphones may also be placed anywhere within the electrochemical cell, which may provide an optimal audio experience for a user of the electronic device.

Figure 5:
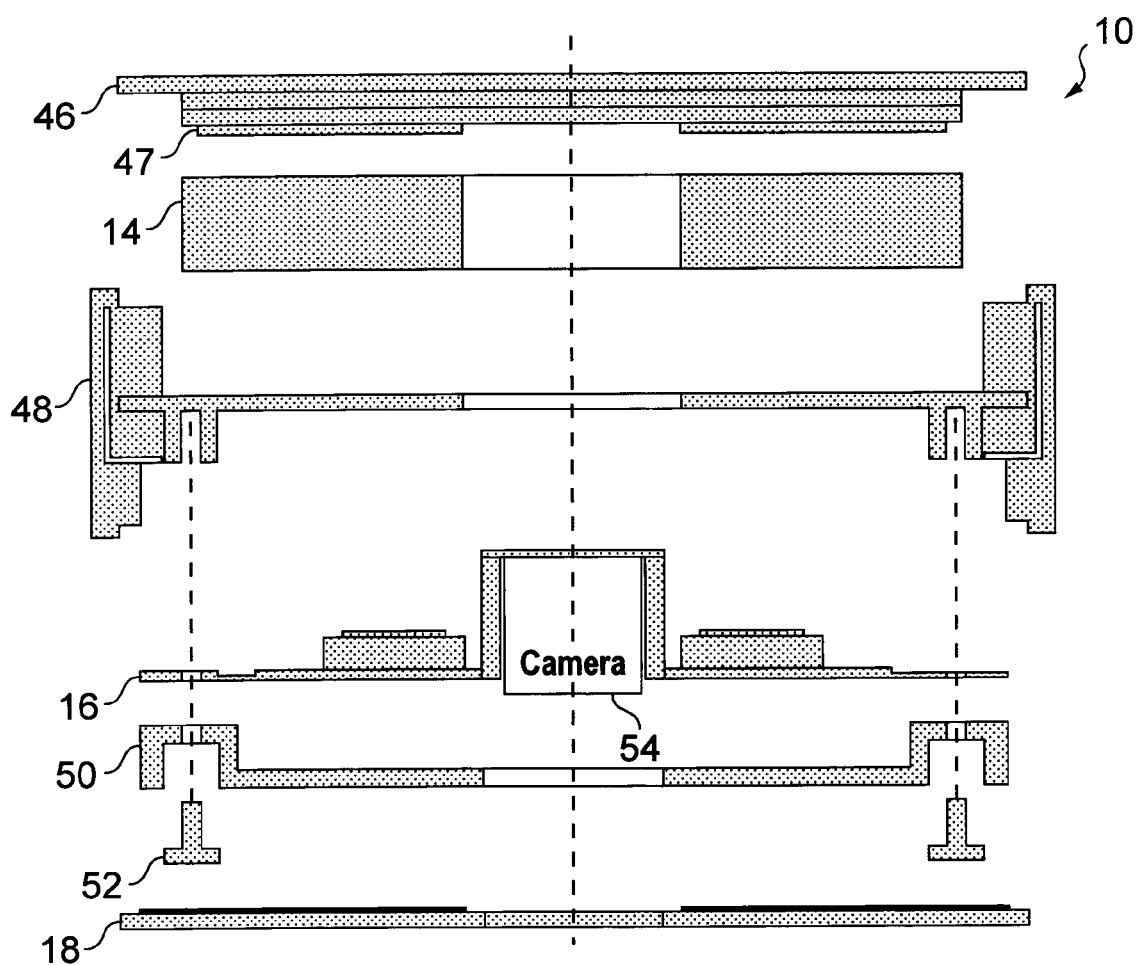
FIG. 5 illustrates a cross sectional side view of another apparatus according to various embodiments of the invention.

FIG. 5 illustrates a cross sectional side view of another apparatus 10 according to various embodiments of the invention. The apparatus 10 is similar to the apparatus illustrated in FIG. 1 and where the features are similar, the same reference numerals are used.

The apparatus 10 has a laminate structure and includes (from the top of FIG. 5 to the bottom of FIG. 5) a display 46 (which may be a touch screen display) including a display gasket 47, an electrical energy storage device 14, a first chassis 48, a printed wiring board 16, a second chassis 50 and a cover 18. The first chassis 48 and the second chassis 50 may be fastened together via one or more fasteners 52 (such as screws). The first chassis 48 is configured to receive and fasten the cover 18 and the display 46 together.

In various embodiments, the printed wiring board 16 is an embedded flex (e-flex) and the electronic components of the apparatus 10 are mounted on a single side of the embedded flex. For example, the electronic components may be mounted on the side of the embedded flex 16 that faces the chassis 48. The embedded flex 16 may have the same or similar dimensions (when viewed in plan) as the display 46 and the/or the electrical energy storage device 14.

The apparatus 10 also includes a camera 54 that is mounted on the printed wiring board 16. The electrical energy storage device 14, the first chassis 48, the second chassis 50 and the cover 18 include apertures that are configured to receive the camera 54 therein. In some embodiments, the cover 18 may be made from a single piece of transparent material, such as glass or transparent polymer. Therefore there may not be a specific "window" for the lens in the cover 18 as the whole cover 18 will be optically useable.

Figure 6:
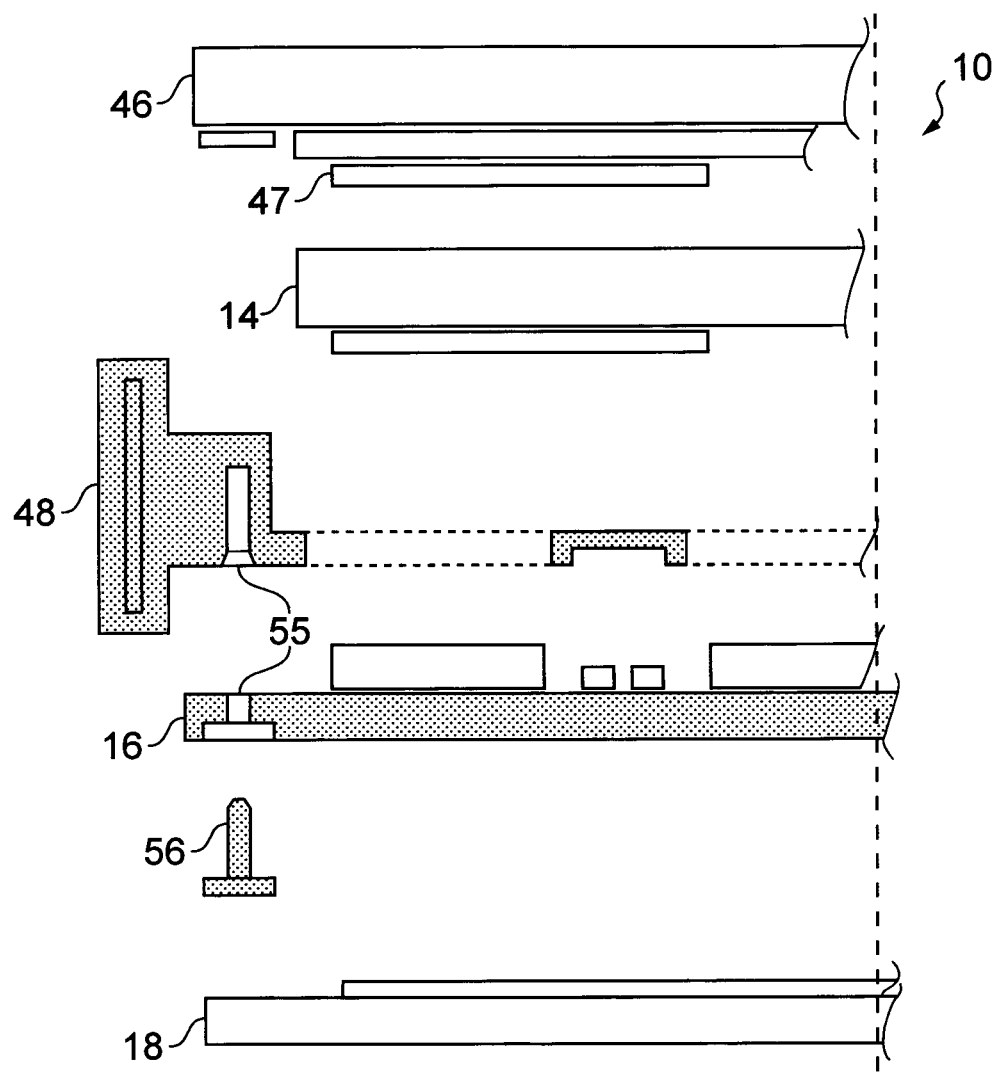
FIG. 6 illustrates a cross sectional side view of a further apparatus according to various embodiments of the invention.

FIG. 6 illustrates a cross sectional side view of a further apparatus 10 according to various embodiments of the invention. The apparatus illustrated in FIG. 6 is similar to the apparatus illustrated in FIG. 5 and where the features are similar, the same reference numerals are used.

The apparatus 10 illustrated in FIG. 6 differs from the apparatus illustrated in FIG. 5 in that it does not include the second chassis 50 and instead includes one or more holes 55 in the first chassis 48 and the printed wiring board 16 that are configured to receive one or more countersunk screws 56. Since the apparatus 10 illustrated in FIG. 6 does not include a second chassis 50, the depth of the apparatus of FIG. 6 may be less than the depth of the apparatus of FIG. 5. In some embodiments, the depth of the apparatus illustrated in FIG. 6 may be less than eight millimeters and may be seven and a half millimeters.

Figure 7:
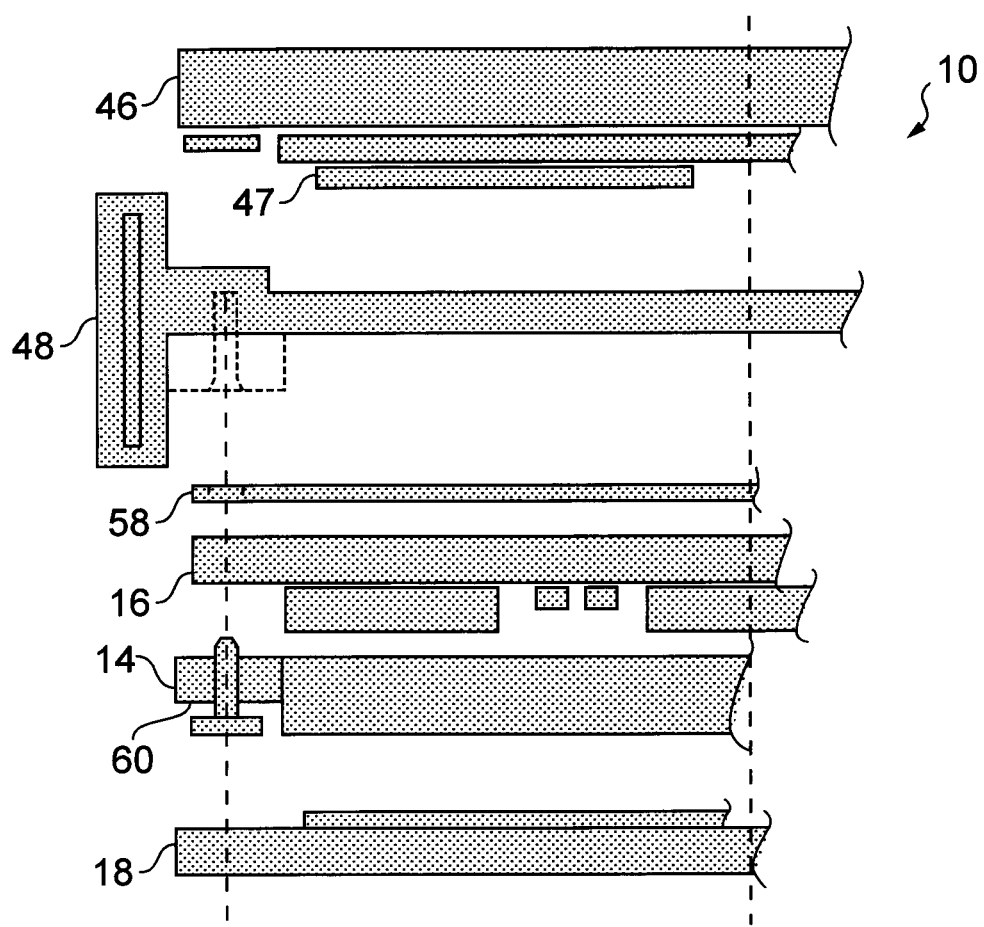
FIG. 7 illustrates a cross sectional side view of another apparatus according to various embodiments of the invention.

FIG. 7 illustrates a cross sectional side view of another apparatus 10 according to various embodiments of the invention. The apparatus 10 is similar to the apparatus illustrated in FIG. 1 and where the features are similar, the same reference numerals are used.

The apparatus 10 has a laminate structure and includes (from the top of FIG. 7 to the bottom of FIG. 7) a display 46 (which may be a touch screen display) including a display gasket 47, a chassis 48, adhesive 58, a printed wiring board 16, an electrical energy storage device 14 and frame 60 and a cover 18. The printed wiring board 16 and the chassis 48 are coupled to one another via the adhesive 58. The frame 60 is coupled to the electrical energy storage device 14 and in some embodiments, the frame 60 may be moulded around the electrical energy storage device 14. The chassis 48 and the frame 60 may be fastened together via one or more fasteners (such as screws). The chassis 48 is configured to receive and fasten the cover 18 and the display 46 together. The electrical energy storage device 14 and the cover 18 include apertures that are configured to receive a camera therein.

The apparatus 10 illustrated in FIG. 7 provides an advantage in that since the chassis 48 and the printed wiring board 16 are coupled together via adhesive, there is relatively good heat transfer between the printed wiring board 16 and the chassis 48 and this may result in better performance of electronic components mounted on the printed wiring board 16. This advantage may also enable components that operate at relatively high temperatures (such as high performance processors or power amplifiers) to be mounted on the printed wiring board.

Figure 8:
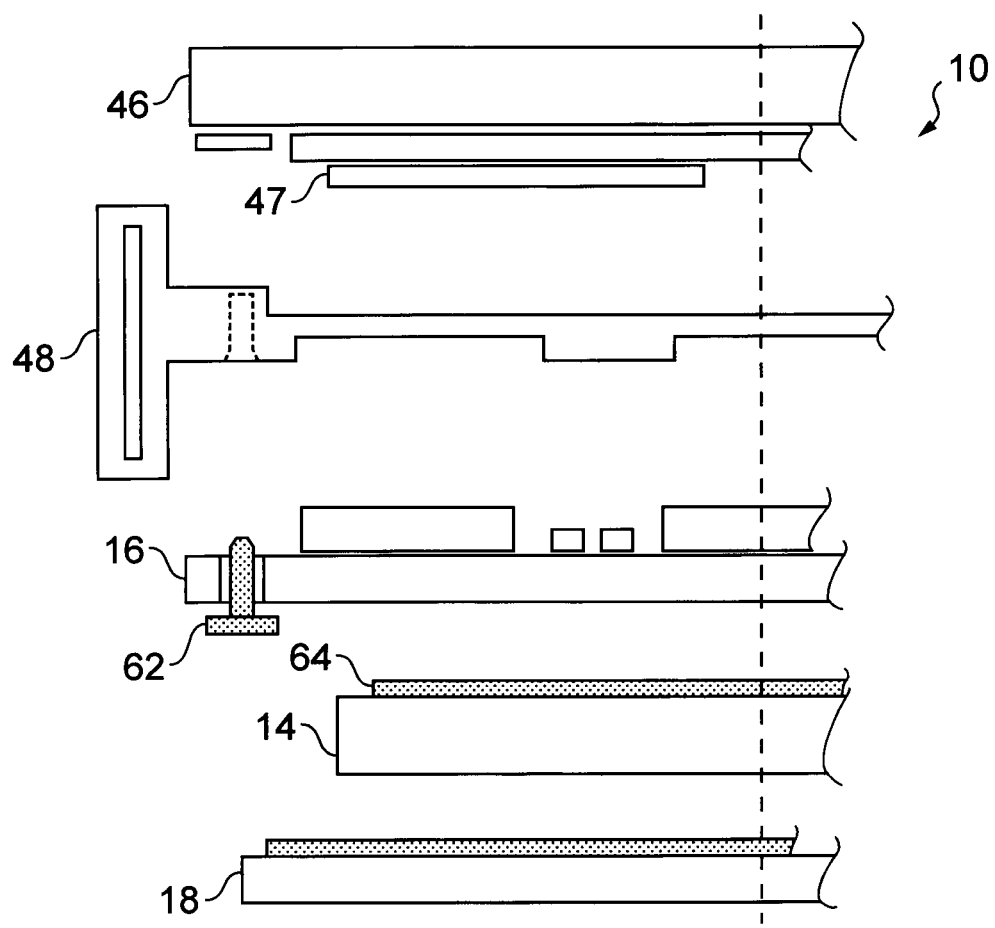
FIG. 8 illustrates a cross sectional side view of a further apparatus according to various embodiments of the invention.

FIG. 8 illustrates a cross sectional side view of a further apparatus 10 according to various embodiments of the invention. The apparatus 10 illustrated in FIG. 8 is similar to the apparatus illustrated in FIG. 7 and where the features are similar, the same reference numerals are used.

The apparatus 10 illustrated in FIG. 8 differs from the apparatus illustrated in FIG. 7 in that it does not include the frame 60, and the printed wiring board 16 is coupled to the chassis 48 via one or more fasteners 62 (such as screws). Furthermore, the electrical energy storage device 14 is coupled to the printed wiring board 16 via adhesive 64.

Figure 9:
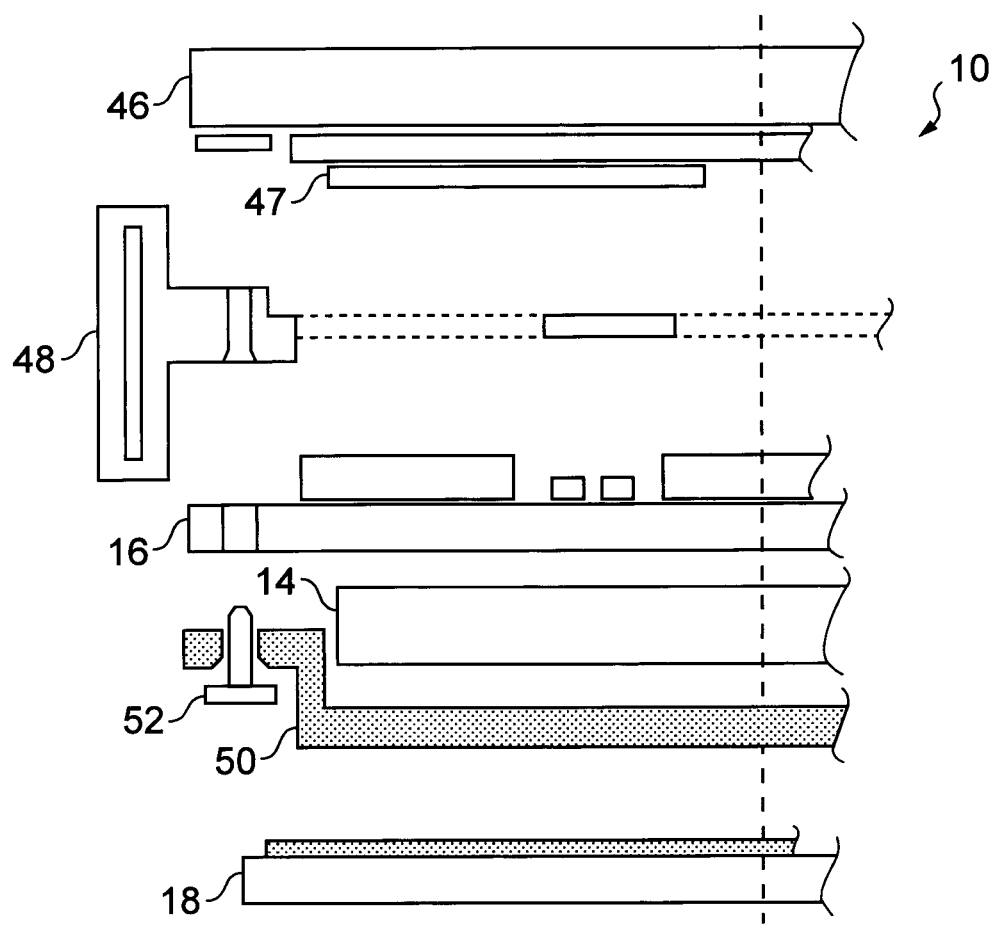
FIG. 9 illustrates a cross sectional side view of another apparatus according to various embodiments of the invention.

FIG. 9 illustrates a cross sectional side view of another apparatus 10 according to various embodiments of the invention. The apparatus 10 illustrated in FIG. 9 is similar to the apparatus 10 illustrated in FIG. 5 and where the features are similar, the same reference numerals are used.

The apparatus 10 illustrated in FIG. 9 differs from the apparatus illustrated in FIG. 5 in that the electrical energy storage device 14 is not positioned between the display 46 and the first chassis 48, but is instead positioned between the second chassis 50 and the printed wiring board 16. Consequently, the electrical energy storage device 14 is fastened in the apparatus 10 by the second chassis 50.

Figure 10:
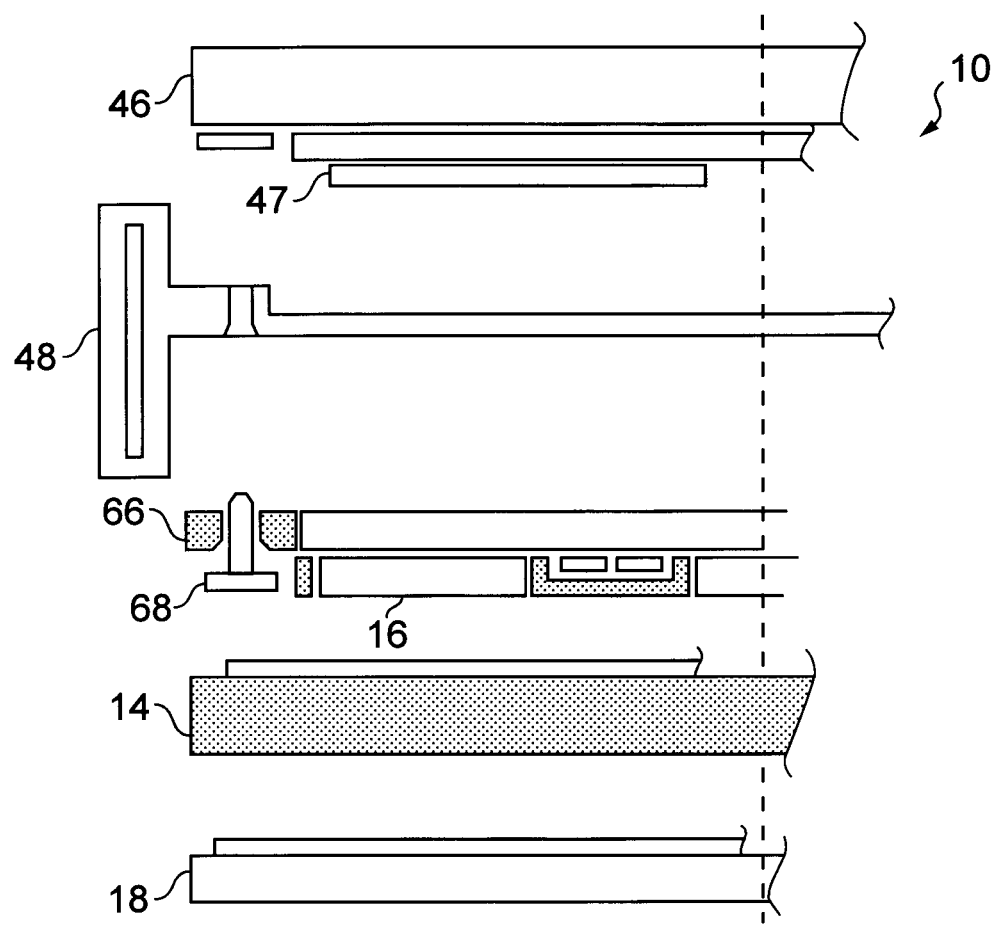
FIG. 10 illustrates a cross sectional side view of a further apparatus according to various embodiments of the invention.

FIG. 10 illustrates a cross sectional side view of a further apparatus 10 according to various embodiments of the invention. The apparatus 10 illustrated in FIG. 10 is similar to the apparatus illustrated in FIG. 8 and where the features are similar, the same reference numerals are used.

In this embodiment, the apparatus 10 includes a second chassis 66 that is coupled to the first chassis 48 via fasteners 68 (such as screws) and fastens the printed wiring board 16 within the apparatus 10. The electrical energy storage device 14 is coupled to the second chassis 66 via adhesive.

Figure 11:
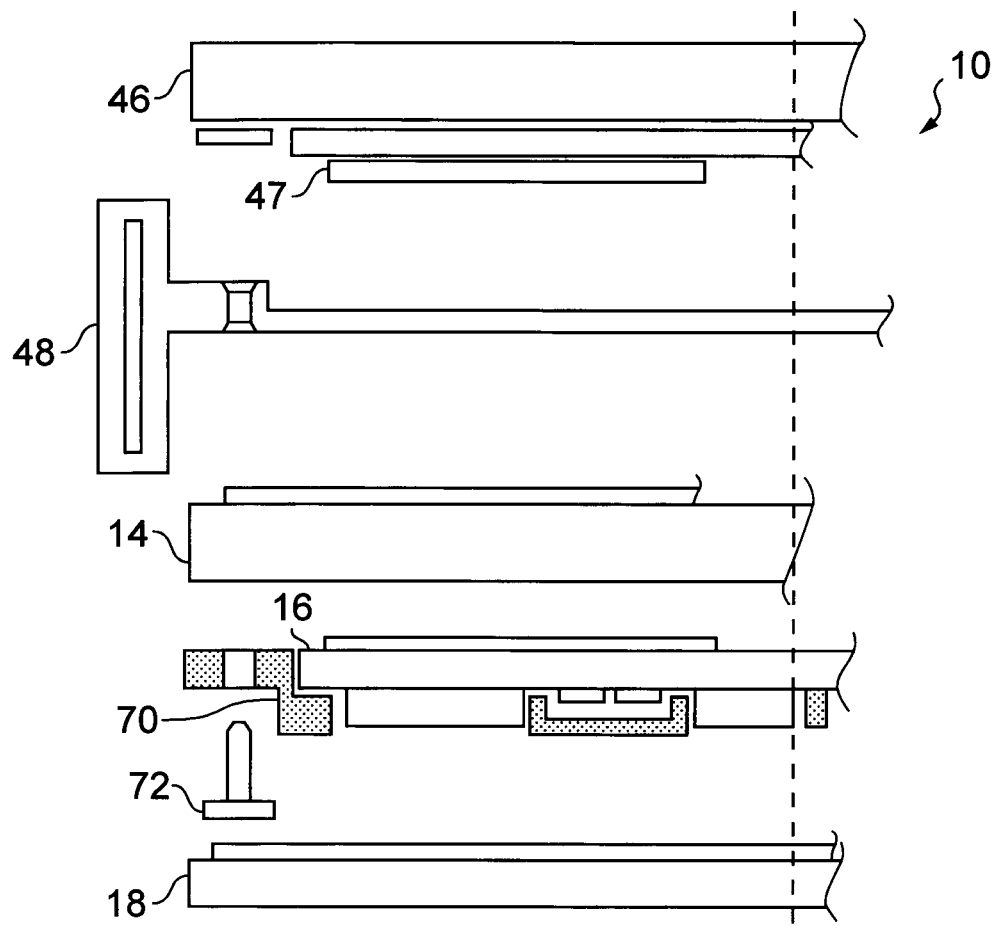
FIG. 11 illustrates a cross sectional side view of another apparatus according to various embodiments of the invention.

FIG. 11 illustrates a cross sectional side view of another apparatus 10 according to various embodiments of the invention. The apparatus 10 illustrated in FIG. 11 is similar to the apparatus illustrated in FIG. 10 and where the features are similar, the same reference numerals are used.

In this embodiment, the apparatus 10 includes a second chassis 70 that is coupled to the first chassis 48 via fasteners 72 (such as screws) and fastens the printed wiring board 16 within the apparatus 10. The electrical energy storage device 14 is coupled to the second chassis 70 via adhesive and is sandwiched between the first chassis 48 and the second chassis 70.

Figure 12:
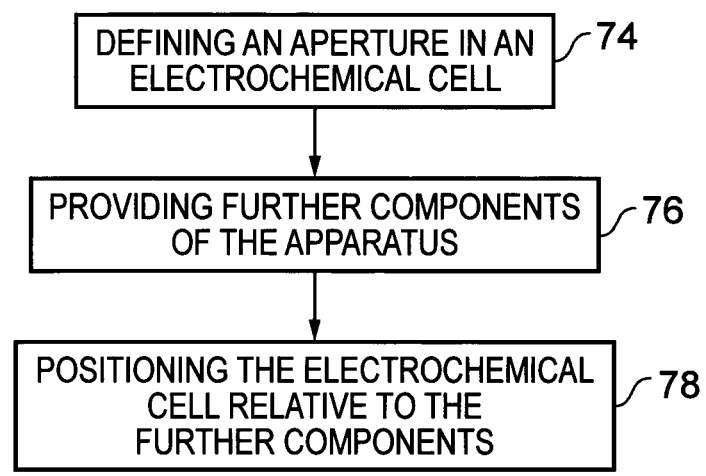
FIG. 12 illustrates a flow diagram of a method of forming an apparatus according to various embodiments of the invention.

FIG. 12 illustrates a flow diagram of a method of forming an apparatus 10 according to various embodiments of the invention.

At block 74, the method includes defining an aperture in an electrochemical cell. For example, where the electrochemical cell is a laminated structure as illustrated in FIG. 3, the method may include first forming apertures in each of the layers 30, 32, 34, 36, 38 of the electrochemical cell 28 and then coupling the layers 30, 32, 34, 36, 38 together. By way of another example, where the electrochemical cell is a rolled structure as illustrated in FIG. 4, the method may include rolling the layer 45, subjecting the rolled layer 45 to heat treatment, and then cutting the aperture 42 through the rolled layer 45.

At block 76, the method includes providing further components of the apparatus 10. For example, the method may include providing any of the components illustrated in FIG. 1 or in any of FIGS. 5 and 11 (such as the printed wiring board 16 and the chassis 48).

At block 78, the method includes positioning the electrochemical cell relative to the further components of the apparatus 10. For example, the electrochemical cell may be positioned in any of the positions illustrated in FIGS. 5 to 11. It should be appreciated that by positioning the electrochemical cell, the one or more components (such as a camera) are positioned within the aperture of the electrochemical cell in this block.

The blocks illustrated in the FIG. 12 may represent steps in a method and/or sections of code in a computer program. For example, one or more processors may read the computer program and control machinery to perform the method blocks illustrated in FIG. 12. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed. For example, an electrochemical cell according to various embodiments of the invention may be formed as illustrated in FIGS. 13 and 14.

Figure 13:
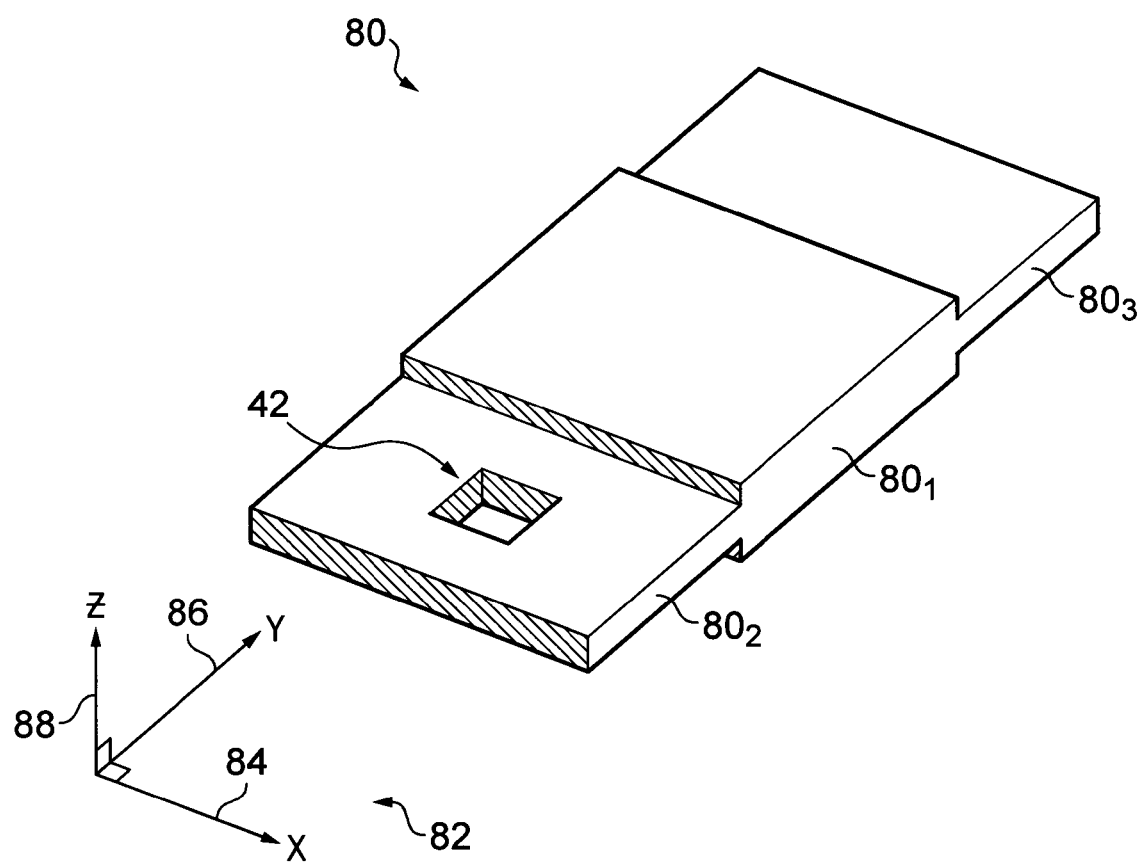
FIG. 13 illustrates a perspective view of a further electrochemical cell according to various embodiments of the invention.
Figure 14:
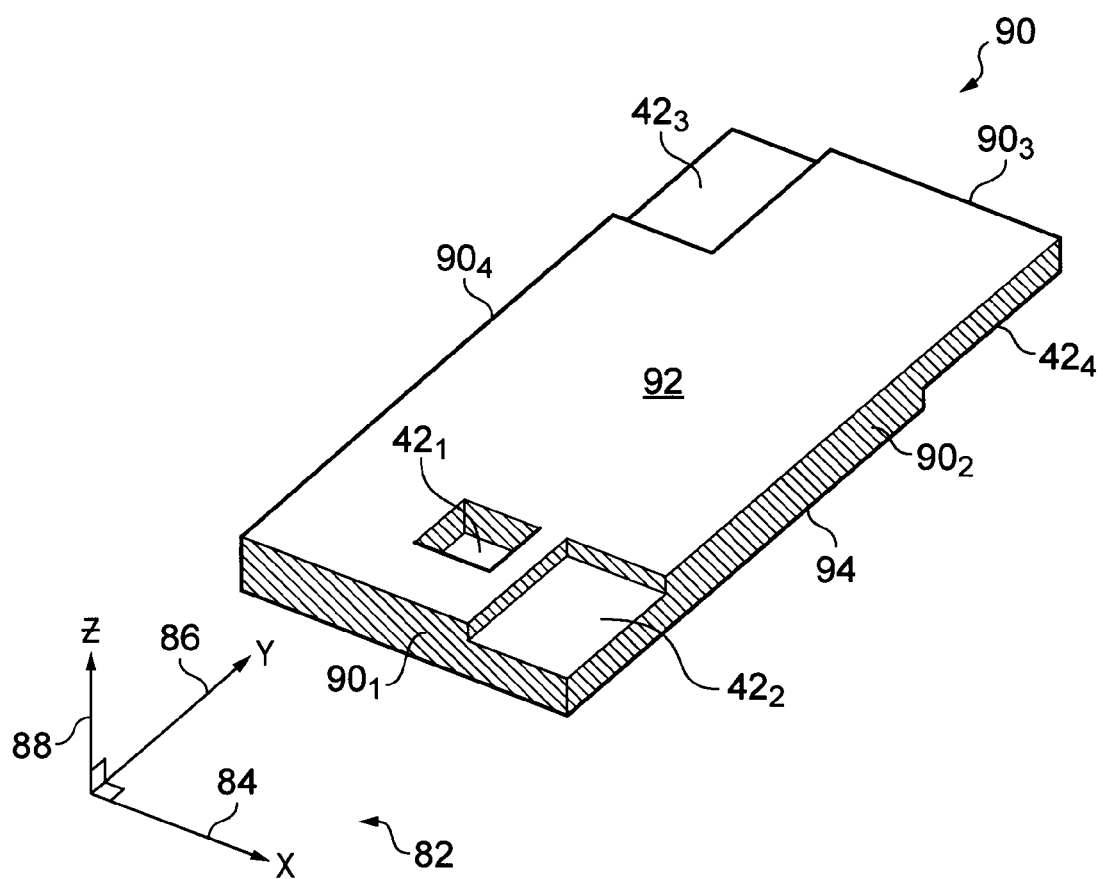
FIG. 14 illustrates a perspective view of another electrochemical cell according to various embodiments of the invention.

FIG. 13 illustrates a perspective view of an electrochemical cell 80 according to various embodiments of the invention and a Cartesian co-ordinate system 82.

The Cartesian co-ordinate system 82 includes an X axis 84, a Y axis 86 and a Z axis 88 that are orthogonal to one another.

The electrochemical cell 80 is generally planar and is oriented substantially parallel to the plane defined by the X axis 84 and the Y axis 86. The electrochemical cell 80 includes a first portion $80_1$, a second portion $80_2$ and a third portion $80_3$. The first portion $80_1$ is sandwiched between the second portion $80_2$ and the third portion $80_3$ and has a greater thickness (that is, the depth of the first portion $80_1$ in the Z axis 88 is greater than the depth of the second and third portions $80_2$, $80_3$ in the Z axis). The second portion $80_2$ defines an aperture 42 therein that forms a through hole.

FIG. 14 illustrates a perspective view of an electrochemical cell 90 according to various embodiments of the invention and the Cartesian co-ordinate system 82.

The electrochemical cell 90 is a generally planar cuboid and is oriented substantially parallel to the plane defined by the X axis 84 and the Y axis 86. The electrochemical cell 90 has a top surface 92, a bottom surface 94, a first side edge $90_1$, a second side edge $90_2$, a third side edge $90_3$ and a fourth side edge $90_4$.

The electrochemical cell 90 defines a first aperture $42_1$, a second aperture $42_2$, a third aperture $42_3$, and a fourth aperture $42_4$, some or all of which are configured to receive one or more components of the apparatus 10. The first aperture $42_1$ is located near the first side edge $90_1$ and is a through hole. The second aperture $42_2$ is located at the corner defined by the first side edge $90_1$ and the second side edge $90_2$ and is an open blind hole formed in the top surface 92. The third aperture $42_3$ is located at the corner defined by the third side edge $90_3$ and is an open blind hole formed in the top surface 92. The fourth aperture $42_4$ is located at the corner defined by the second side edge $90_2$ and the third side edge $90_3$ and is an open blind hole formed in the bottom surface 94.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus comprising:
   a display;
   a printed wiring board having a camera mounted on the printed wiring board;
   a chassis configured to receive the printed wiring board; and
   an electrochemical cell defining an aperture therein, the electrochemical cell being positioned between the display and the printed wiring board, the aperture being configured to receive the camera and the electrochemical cell being electrically connected to the printed wiring board.

2. An apparatus as claimed in claim 1, wherein the aperture is a blind hole.

3. An apparatus as claimed in claim 1, wherein the aperture is enclosed by the electrochemical cell.

4. An apparatus as claimed in claim 1, wherein the aperture is open along at least one side edge of the aperture.

5. An apparatus as claimed in claim 1, wherein the electrochemical cell includes a plurality of electrodes, the aperture extending through the plurality of electrodes.

6. An apparatus as claimed in claim 5, wherein the electrochemical cell comprises a rolled layer, the rolled layer including the plurality of electrodes.

7. An apparatus as claimed in claim 5, wherein the plurality of electrodes have a planar laminate structure.

8. An apparatus as claimed in claim 1, wherein the electrochemical cell is positioned between the display and the chassis.

9. An apparatus as claimed in claim 1, further comprising a cover defining an aperture for a camera, the electrochemical cell being positioned between the cover and the printed wiring board.

10. An apparatus as claimed in claim 9, wherein the electrochemical cell is fastened to the printed wiring board via adhesive.

11. An apparatus as claimed in claim 1, further comprising a further chassis configured to receive the display, wherein the electrochemical cell and the printed wiring board are positioned between the chassis and the further chassis.

12. An apparatus as claimed in claim 1, further comprising a cover defining an aperture for a camera, a further chassis configured to receive the display, the electrochemical cell being positioned between the chassis and the cover and being fastened to the chassis via adhesive.

13. An apparatus as claimed in claim 1, further comprising a further chassis configured to receive the display, the electrochemical cell being positioned between the chassis and the further chassis and fastened to the chassis via an adhesive.

14. A portable electronic device comprising an apparatus as claimed in claim 1.

15. A method comprising:
providing a display;
providing a printed wiring board and mounting a camera on the printed wiring board;
providing a chassis configured to receive the printed wiring board; and
defining an aperture in an electrochemical cell and positioning the electrochemical cell between the display and the printed wiring board, the aperture being configured to receive the camera and the electrochemical cell being electrically connected to the printed wiring board.

16. A method as claimed in claim 15, wherein the aperture is a blind hole.

17. A method as claimed in claim 15, wherein the electrochemical cell includes a plurality of electrodes, the aperture extending through the plurality of electrodes.

18. A method as claimed in claim 15, positioning the electrochemical cell between the display and the chassis.

19. A method as claimed in claim 15, further comprising providing a cover defining an aperture for a camera, and positioning the electrochemical cell between the cover and the printed wiring board.

20. A method as claimed in claim 19, further comprising fastening the electrochemical cell to the printed wiring board via adhesive.

* * * * *